United States Patent [19]  [11] 4,090,613
McPherson  [45] May 23, 1978

[54] STORAGE DEVICE
[75] Inventor: Bruce M. McPherson, Ithaca, N.Y.
[73] Assignee: NCR Corporation, Dayton, Ohio
[21] Appl. No.: 771,054
[22] Filed: Feb. 22, 1977

Related U.S. Application Data

[63] Continuation of Ser. No. 625,400, Oct. 24, 1975, abandoned.

[51] Int. Cl.² .............................................. A47F 7/00
[52] U.S. Cl. .................................... 211/69.5; 248/126; 248/314; 248/346
[58] Field of Search ........................ 211/60, 71, 74, 75, 211/87, 88, 69.1, 69.5; 248/121, 126, 127, 128, 133, 146, 148, 149, 176, 188.1–188.3, 309–311, 314, 346, 346.1, 349, 12

[56] References Cited

U.S. PATENT DOCUMENTS

| | | | |
|---|---|---|---|
| 582,787 | 5/1897 | Hayne | 211/74 |
| 1,804,120 | 5/1931 | Songbusch | 211/69.5 |
| 2,591,349 | 4/1952 | Goebel | 211/69.5 X |
| 2,779,713 | 1/1957 | Touney | 248/146 |
| 3,021,638 | 2/1962 | Kristek | 248/188.2 |
| 3,090,590 | 5/1963 | Hester | 248/346 |
| 3,293,528 | 12/1966 | Rosen et al. | 248/309 |
| 3,524,614 | 8/1970 | Sorth | 248/346.1 |
| 3,819,136 | 6/1974 | Finke | 248/188.2 |

Primary Examiner—Roy D. Frazier
Assistant Examiner—Terrell P. Lewis
Attorney, Agent, or Firm—J. T. Cavender; Wilbert Hawk, Jr.; Richard W. Lavin

[57] ABSTRACT

A holder for a data pen or similar manually manipulated instrument is provided which is adapted for positioning on a horizontal or vertical surface and comprises a holder segment releasably mounted on an angled base segment. The holder segment includes a socket for holding a light pen, etc. in a stored position. The holder segment is mounted between two positions on the base segment to position the pen at a preferred angle when the base segment is positioned either on a horizontal or vertical surface. The bottom end of the socket is open and extends to a position within an aperture located in the base segment for disposing of dirt deposited in the socket. The base segment is constructed to support electronic apparatus associated with the data pen, etc.

18 Claims, 7 Drawing Figures

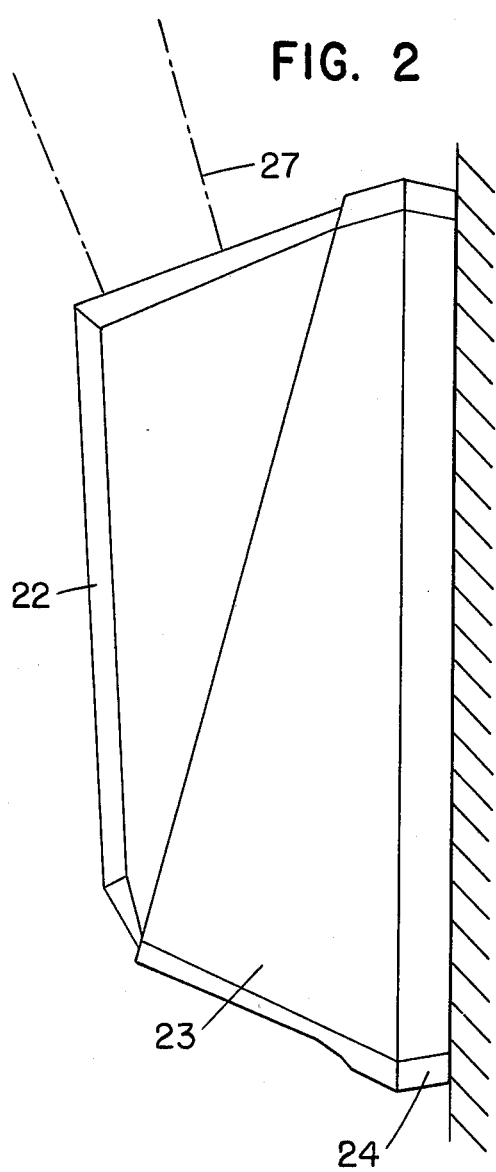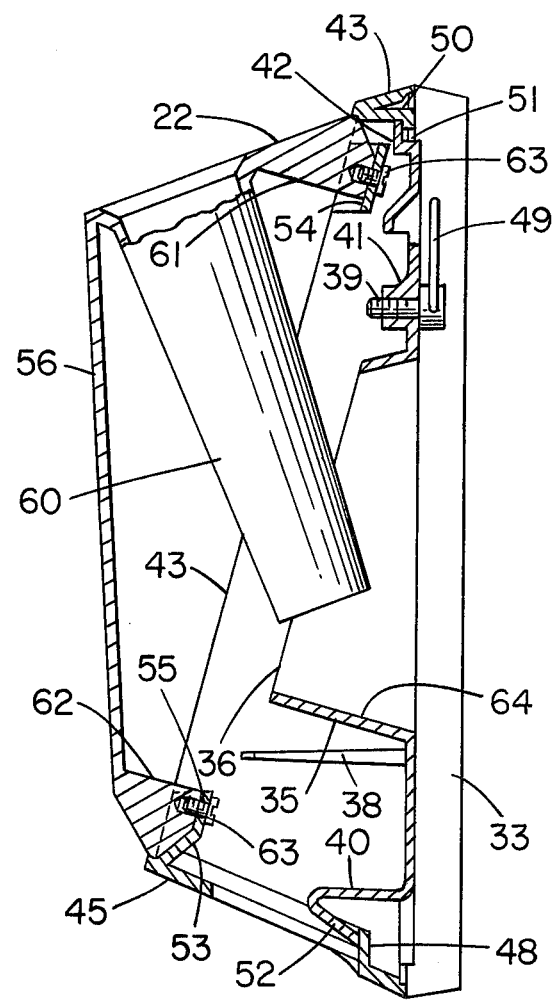

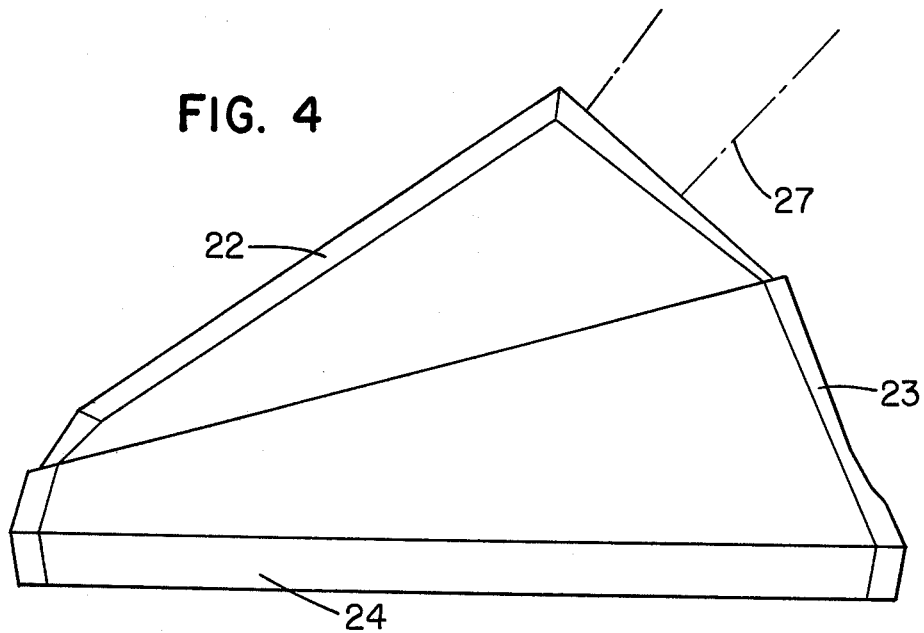
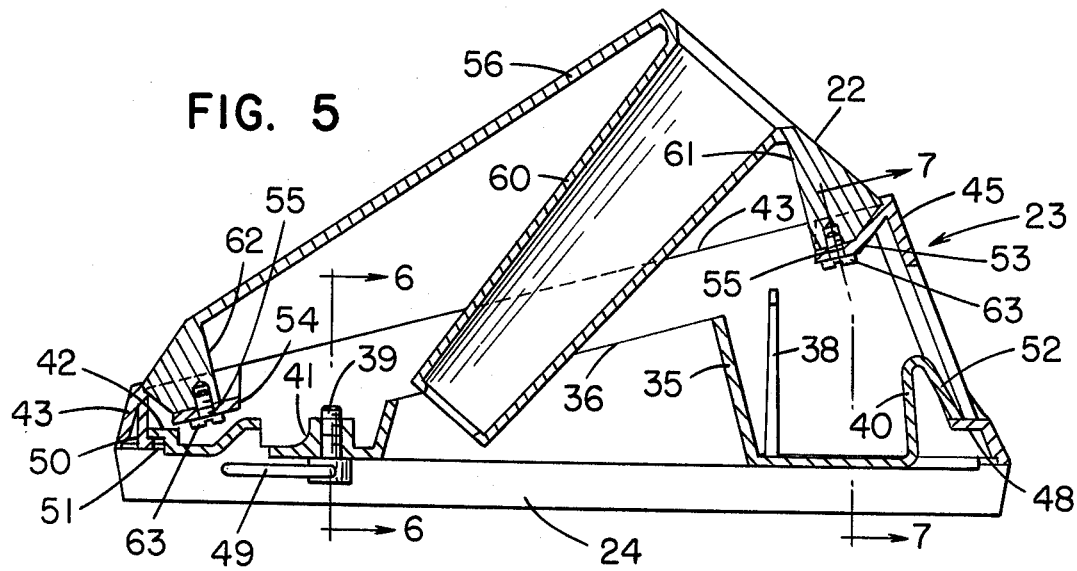
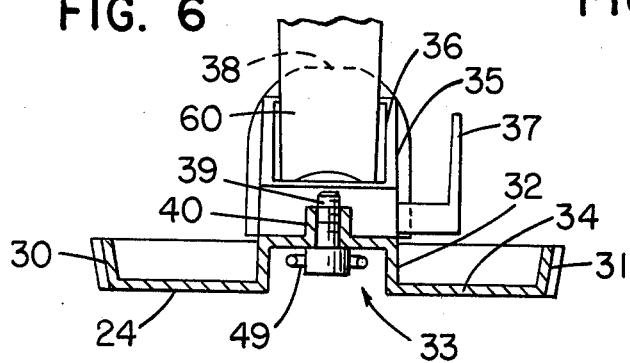
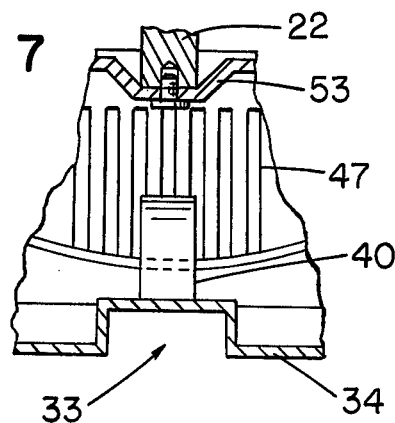

STORAGE DEVICE

This is a continuation of application Ser. No. 625,400, filed Oct. 24, 1975, now abandoned.

BACKGROUND OF THE INVENTION

Modern development in checkout systems for use in certain department store and supermarket operations includes the use of a reader in the form of a data pen or wand for optically or magnetically reading data on coded labels attached to the merchandise items purchased by the customer. The data pen is scribed across the label thereby either optically or magnetically sensing the coded indicia and generating electrical signals representing the indicia sensed. These electrical signals are transmitted over a communication cable attached to the data pen to a control unit where the signals are decoded and the resulting data assembled, displayed and printed. During the checkout operation, the operator is required to perform other operations which do not involve the use of the data pen such as receiving and dispensing money, coupons, etc. During these operations, the operator will store the data pen in a holder until the next reading operation is to occur.

Since the checkout environment varies with each store installation, it has been found that a data pen holder which has been designed for a horizontal installation for use in one type of checkout environment could not in many instances be used in another store environment where the holder is required to be installed in a vertical position. In this latter instance, due to limited space availability, etc., the data pen within the vertically mounted holder may extend out at such an angle as to interfere with the movement of the checkout operator. Therefore, there has developed a need for a data pen holder which can be mounted in either a horizontal or vertical position wherein the data pen will be orientated in each position at an angle which is convenient for its removal and insertion by the checkout operator, and wherein the angular extension of such data pen in each instance will not be in the way of either the checkout operator or customer. In addition, the use of a data pen requires that any foreign material picked up by the tip or deposited in the socket be removed. The location of electronic equipment associated with the data pen must of course also be considered. It is, therefore, an object of the present invention to provide a data pen holder which can be mounted in either a horizontal or vertical position, each position supporting the data pen at an angle convenient to the operator. Another object of this invention is to provide a data pen holder which is constructed to handle dirt and other objects falling into the socket when the holder is in either the horizontal or vertical position. A further object of this invention is to provide a data pen holder which is constructed to provide storage area for associated electronics equipment. A still further object of this invention is to provide a data pen holder which is simple in construction, made of a low cost material and convenient for diassembly and assembly with a minimum of tools required.

SUMMARY OF THE INVENTION

In order to fulfill these objects, there is provided a data pen holder comprising a hollow base segment constructed to support electronic equipment for use with the data pen. Releasably mounted to the base segment is a housing assembly including a hollow support segment having a supporting surface orientated at a first predetermined angle with the lower surface of the base segment. Releasably mounted to the supporting surface of the support segment is a housing segment containing a cone-shaped storage socket extending along an axis which is at a second predetermined angle with the lower edge of the housing segment. The housing segment is mounted to the support segment in a first position to orientate the storage socket at a desirable angle with the lower surface of the base member when the holder is in a horizontal position. This desirable angle is equal to the sum of the first and second predetermined angles above described. When the holder is to be mounted in a generally vertical direction, the housing segment is mounted to the support segment 180° from its first position which orientates the storage socket at a second desirable angle with the lower surface of the base member for the storing and retrieving of the data pen by the operator. This second desirable angle is equal to the difference between the first and second predetermined angles above described. Located within the base segment is a raised opening extending through the bottom surface of the base segment. When the housing segment is in either of its two mounted positions, the lower end of the storage socket, which is open, will be located within the raised opening to permit disposal of any dust or other dirt collected on the operating head portion of the data pen or other objects deposited in the socket.

BRIEF DESCRIPTION OF THE DRAWINGS

FIG. 2 is a side view of the holder when mounted in a vertical position and showing the angle of orientation of the data pen within the holder.

FIG. 3 is a side sectional view of the holder mounted in a vertical position showing details of the cone-shaped storage socket and its location with respect to the raised opening in the base segment.

FIG. 4 is a side view of the holder when positioned on a horizontal surface.

FIG. 5 is a side sectional view of the holder assembled for horizontal positioning showing details of the fastening means for mounting the support segment to the base segment.

FIG. 6 is a partial detailed view taken on lines 6—6 of FIG. 5 showing details of the mounting member located within the base segment.

FIG. 7 is a partial detailed view taken on lines 7—7 of FIG. 5 showing details of the fastening member for securing the base segment to the support segment.

DESCRIPTION OF THE PREFERRED EMBODIMENT

Figure 1:
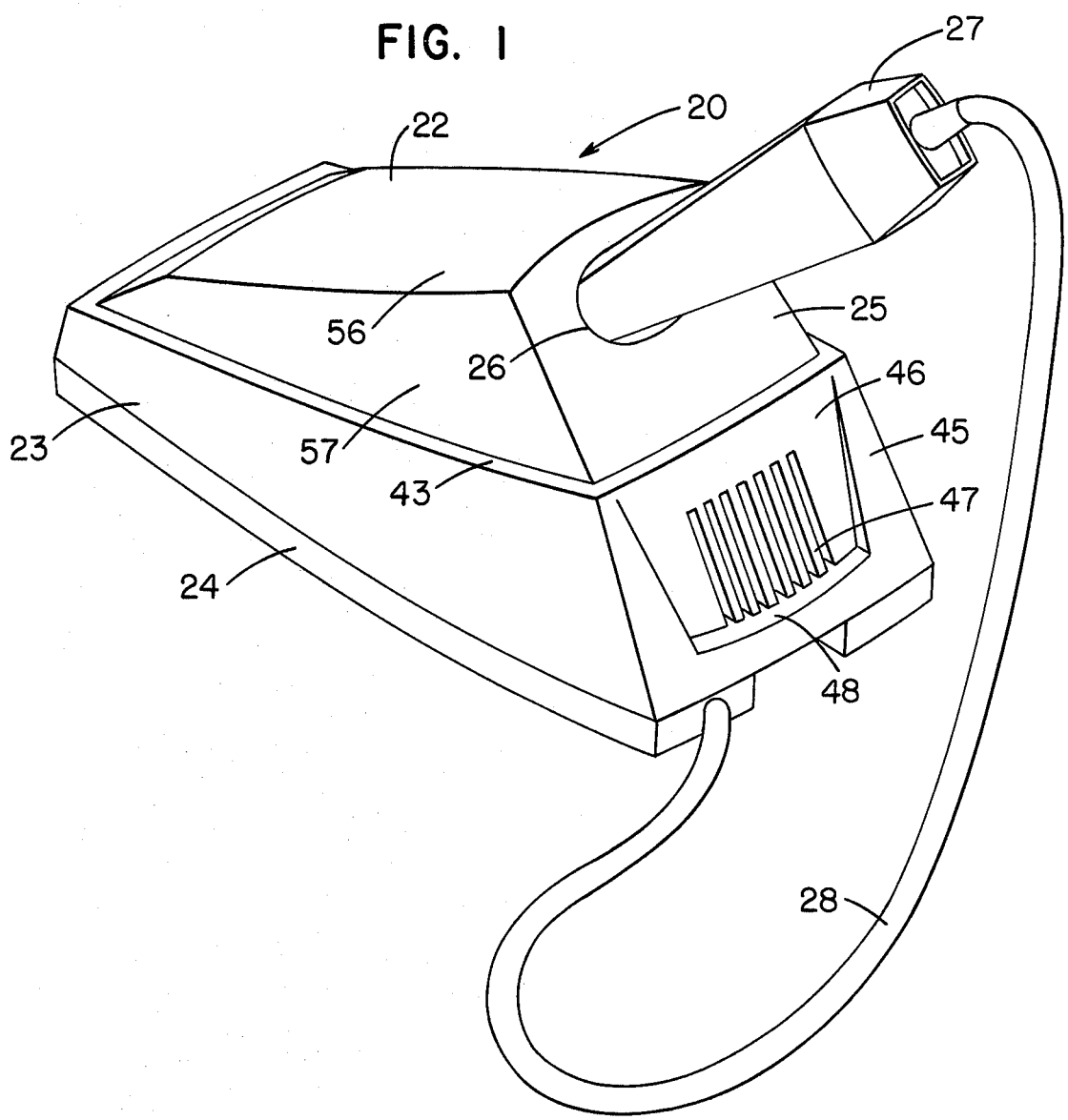
FIG. 1 is an oblique view of the holder and a data pen stored within the holder when mounted in a horizontal position.

Referring now to FIG. 1 of the drawing, there is shown an oblique view of the holder of the present embodiment which comprises an assembly generally indicated as 20 consisting of a housing segment 22, a support segment 23 and a base segment 24. Located in the front wall portion 25 of the housing segment 22 is an aperture 26 within which may be positioned the instrument which is to be supported by the holder. In the present embodiment, a light pen 27 for optically reading bar code indicia is positioned within the aperture 26 and extends outwardly from the aperture 26 at an angle with the base segment 24 which is convenient for handling by the user or operator. A communication cable 28 is attached to the rear of the light pen 27 and is mounted within the base segment 24. As will be described hereinafter, the holder 20 of the present invention is capable of being mounted in a horizontal or vertical position. The holder 20 is shown in FIGS. 1 and 4 in the horizontal position while FIGS. 2 and 3 illustrate the holder mounted in the vertical position.

As shown more particularly in FIGS. 5, 6 and 7, the base segment 24 consists of a one piece flat tray-like member preferably molded of any suitable type of plastic material, such as a high impact styrene, and having side walls 30, 31 and a raised center portion 32 which forms a slot 33 extending lengthwise of the bottom surface 34 of the base segment.

Formed as part of the center portion 32 is a rectangular-shaped hollow neck portion 35 having a slanted top opening 36 which extends through to the slot 33 in the bottom surface 34 of the base segment 24. Extending from the side of the neck portion 35 is an L-shaped support member 37 (FIG. 6) which may be used as a support for electronic equipment associated with the light pen 27. The holder 20 of the present embodiment includes a speaker for generating a signal whenever a valid reading of the data on the label is obtained by the light pen, a potentiometer for adjusting the volume of the signal and a quick disconnect member for releasing the communication cable 28 from the holder 20. The support member 37 may be utilized in supporting the potentiometer.

Located adjacent the front edge of the neck portion 35 and formed as part of the center portion 32 is an upstanding baffle member 38 for supporting the speaker and a front upstanding snap action fastening portion 40 for use in attaching the base segment 24 to the support segment 23. Located at the rear of the neck portion 35 and formed as part of the center portion 32 is an upstanding boss 41 supporting a screw member 39 or other type of a fastening member for mounting a support member such as a ring or clip 49 or the like to the base segment 24 for supporting the holder 20 from a vertical surface. Located at the left end of the center portion 32 (FIG. 5) is a rear overhang portion 42. In a manner that will be described more fully hereinafter, the fastening portion 40 and the overhang portion 42 function to releasably secure the support segment 23 to the base segment 24.

The support segment 23 is formed of a plastic material similar to the base segment 24 and comprises a hollow housing having a sloping top supporting edge portion 43 (FIGS. 1 and 5), a rear edge portion 44 and a front edge portion 45, the latter including a recessed portion 46 (FIG. 1) having a plurality of louvers 47 which allows communication with the inside of the support segment 23 for use in disengaging the base segment 24 from the support segment 23, as will be described more fully, hereinafter. As shown in FIG. 5, the bottom edge 48 of the recessed portion 46 of the support segment 23 extends in a rearward direction while the rear portion 44 of the support segment 23 includes a vertically extending mounting surface 50 having a lower rib portion 51 extending in a horizontal direction. In mounting the support segment 23 to the base segment 24, the rib portion 51 of the support segment 23 is first inserted beneath the overhang portion 42 of the base segment 24. The front edge portion 45 of the support segment 23 is then pressed down against a front wall 52 of the fastening portion 40 of the base segment 24 resulting in the bottom edge 48 of the recessed portion 46 bending the wall 52 rearwardly until the edge 48 is beneath the wall 52, at which time the wall 52 will snap back over the edge 48 to the position shown in FIG. 5, thus fastening the support segment 23 to the base segment 24.

Extending across the top and adjacent the front and rear edges of the support segment 24 are a pair of recessed mounting surfaces 53, 54 (FIGS. 3, 5 and 7), each having an aperture 55 which will accommodate a screw member 63 or the like for use in mounting the housing segment 22 to the support segment 23, as will be described more fully hereinafter. The housing segment 22 is formed of the same plastic material and in the same manner as the base segment 24 and support segment 23 and comprises a hollow housing member which includes a sloping top 56, identical sides 57 and the front wall portion 25 (FIGS. 1 and 5), the latter having formed therein a frusto-conical shaped socket portion 60 for supporting the light pen 27. The socket portion 60 extends from the opening 26 (FIG. 1) inwardly at a predetermined angle with respect to the lower edge of the housing segment 22 (FIGS. 3 and 5). The front 61 and rear 62 edges of the housing segment 22 are secured to the mounting surfaces 53, 54 (FIGS. 5 and 7) of the support segment 23 by means of the screw members 63 or the like.

The present invention contemplates orientating the socket portion 60 and the top supporting edge 43 of the support segment 23 at predetermined angles with a horizontal plane to provide an entry angle of the light pen into the socket portion 60 which is convenient to the checkout operator when the holder is mounted either in the horizontal or vertical position. The invention further contemplates the positioning of the lower end of the socket portion 60 within the confines of the opening 36 of the neck portion 35 when the holder is in either the horizontal or vertical position to allow dirt or other foreign substances picked by the light pen in reading the labels to drop through the neck portion 35 and out of the holder 20 itself.

In accordance, thereof, with the present invention, the socket portion 60 is arranged at an acute angle with respect to the lower edge of the housing segment 22. As shown in FIG. 5, this angle is 35°. The top supporting edge 43 of the support segment 22 is sloped at a 15° angle with the base line of the support segment 23. Thus, when the segments 22 and 23 are mounted in the position shown in FIGS. 1 and 4, where the holder 20 is to be positioned on a horizontal surface, the entry angle of the light pen is 50° with respect to the lower surface of the base segment 24.

On the other hand, when the holder 20 is to be mounted in the vertical direction, the support segment 23 is separated from the base segment 24 by inserting any convenient instrument through the louvers 47 (FIGS. 1 and 7) and thereby engage and move the front wall member 52 of the fastening member 40 in a rearward direction. This movement will dislodge the wall member 52 from engagement with the edge 48 of the recessed portion 46 and allow the support segment 23 to be removed from the base segment 24. The screw members 63 are then removed, followed by the housing segment 22 being rotated 180° and then secured again as so repositioned (FIG. 3) to the support segment 23 by means of the screw members 63. In this instance, as illustrated in FIG. 3, the front 61 and rear 62 edges of the housing segment 22 are positioned reversely from that as described previously; that is, being now secured to the mounting surfaces 54 and 53, respectively. After again securing the support segment 23 to the base segment 24 in the manner described previously, the holder 5 is ready to be mounted to a vertical surface by any suitable mounting means such as the clip member 49 (FIG. 5). This vertical position of the holder 20 is shown in FIG. 2. In this position the entry angle of the light pen is 20° with respect to the lower surface of the base segment 24 — being the difference between the above referenced socket angle and support segment top edge angle. As shown in FIG. 3, when the holder 20 is in the vertical position, the lower end of the socket portion 60 is still positioned within the opening 36 of the neck portion 35. By sloping the front edge 64 of the neck portion 35, it will be seen from FIG. 3 that any dirt or other debris falling from the light pen 27 or otherwise into the opening 26 will be deposited through the slot 33 of the base segment 24 where it will fall to the floor.

While a preferred entry angle of the light pen has been given when mounted in a horizontal or vertical position, it is obvious that the light pen can be orientated at other acute angles without departing from the instant invention. The lateral configuration of the opening 36 of the neck portion 35 is controlled by the orientation angle of the socket 60 and therefore may be varied in accordance with the design of the socket 60, the socket being preferably within the opening when holder 20 is in either the horizontal or vertical position.

As described previously, for simplicity and cost savings reasons, the preferred embodiment of the holder assembly is directed to having each of the component segments formed by any well-known plastic molding process utilizing the properties and the configuration of the plastic material for assembling the segments without the use of other fastener means. While the outer configuration of the segments and the holder have been shown to be generally wedge-shaped, it is obvious that the invention can be utilized with any shaped segments while still functioning for the intended purpose as disclosed in the present invention.

While the principles of the invention have now been made clear in the illustrated embodiment, it will be obvious to those skilled in the art that many modifications of structure, arrangements, elements and components can be made which are particularly adapted for specific environments and operating requirements without departing from these principles. As an example, while the holder 20 is shown mounted in a vertical position, it is obvious that the holder can be mounted in a position other than vertical and still come within the present invention. In addition means other than the clip 49 can be used to mount the holder to the supporting surface. The appended claims are therefore intended to cover any such modifications within the limits of the true spirit and scope of the invention.

What is claimed is:
1. In combination
   (a) a manually manipulated data pen;
   (b) means for orientating said data pen in a plurality of mounted positions including a first support means having a supporting surface at a first angle from a reference plane;
   (c) a second support means for supporting the manually manipulated data pen at a second angle from said reference plane;
   (d) means for mounting said second support means in a plurality of positions on the supporting surface of said first support means, said second support means when mounted in a first position on said first support means supporting said data pen at an angle from said reference plane which is equal to the sum of the said first and second angles and when mounted in a second position on said first support means supporting said data pen at an angle which is equal to the difference between said first and second angles;
   (e) and means carried by said first support means for enabling said first support means to be maintained in a position generally normal to said reference plane when the mounting of said support means on said first support means is in said second position.

2. The combination of claim 1 in which said manually manipulated data pen includes an operating head portion, said first support means comprises a base assembly having a recessed portion and said second support means includes a support member for supporting the data pen at said second angle, the support member positioning the operating head portion of said data pen at said second angle, the support member positioning the operating head portion of said data pen within said recessed portion when the second support means is in either said first and second mounted position whereby said data pen is orientated at a plurality of mounted positions in accordance with the position of said second support means on said first support means.

3. The combination of claim 2 in which said second support member has an opening therein to allow the operating head portion of the data pen to be in communication with the recessed portion of said base assembly when the second support means is in either said first and second mounted position whereby interfering substances located on the operating head portion of the data pen may drop from said head portion into said recessed portion.

4. The combination of claim 3 in which said base assembly includes opening means located within the recessed portion and extending through said base assembly, said support member positioning the operating head portion of said data pen in communication with said opening means when the second support means is in either said first or second mounted position whereby interfering substances located on the operating head portion of the data pen may drop from said head portion and through said opening means.

5. A holder for a manually manipulated instrument having an operating head portion comprising:
   (a) a base assembly having a supporting surface orientated at a first angle from a reference plane, said base assembly having a recessed portion located therein;
   (b) a support means including a support member for supporting the manually manipulated instrument at a second angle from said reference plane;
   (c) means for mounting said support means in a plurality of positions on the supporting surface of said base assembly, said support means when mounted in a first position on said base assembly supporting said instrument at an angle from said reference plane which is equal to the sum of the said first and second angles and when mounted in a second position on said base assembly supporting said instrument at an angle from said reference plane which is equal to the difference between said first and second angles, said support member positioning the operating head portion of said instrument within the recessed portion of the base assembly when the second support means is in either said first or second mounted position whereby interfering substances located on the operating head portion of the instrument may drop from said head portion into said recessed portion;

(d) and means carried by said base assembly for enabling said base assembly to be maintained in a position generally normal to said reference plane when the mounting of said support means on said base assembly is in said second position.

6. The holder of claim 5 in which said base assembly includes a raised neck portion formed integrally with the base assembly within said recessed portion and terminating in an aperture which communicates with the exterior of the base assembly, said support member positioning the operating head portion of said instrument within the neck portion of the base assembly when the second support means is in either said first or second mounted position whereby interfering substances located on the operating head portion of the instrument may drop from said head portion and through said neck portion.

7. The holder of claim 6 in which said support member comprises an elongated socket portion formed integrally with said second support means, said socket portion having an entrance opening and an exit opening and extending in a generally downward direction at said second angle to position the exit opening within the neck portion of the base assembly when the second support means is in either said first or second mounted position wherein the operating head portion of said instrument is in communication with said aperture.

8. A holder for a data pen having an operating head portion and adapted for positioning in a horizontal or vertical direction comprising:

(a) a base assembly including a supporting surface orientated at a first acute angle and a base segment having a lower surface containing an aperture communicating with the exterior of the base segment;

(b) deflecting means formed in said lower surface adjacent said aperture;

(c) a housing segment having a support portion for supporting a data pen at a second acute angle with the lower surface of the housing segment, said support portion includes an open end portion which positions the operating head of the data pen adjacent said aperture and said deflecting means;

(d) means for releasably mounting the housing segment to the supporting surface of the base assembly in a plurality of mounted positions wherein the data pen is supported at an angle with the lower surface of the base segment which is equal to the sum of said first and second angles when the housing segment is in a first mounted position and supported at an angle with the lower surface of the base segment which is equal to the difference between said first and second angles when the housing segment is in a second mounted position, whereby interfering substances gathering on the operating head portion of the data pen will drop through said aperture when the housing member is in said first mounted position and be deflected by said deflecting means through the aperture when the housing member is in said second mounted position;

(e) and means carried by said base assembly for enabling said base assembly to be maintained in a generally vertical direction whereby the instrument is orientated in a generally upright direction when the mounting of the housing segment on said base assembly is in said second mounted position.

9. The holder of claim 8 in which said deflecting means comprises a vertically extending neck portion surrounding said aperture having an opening sufficient to accommodate the open end of said support portion when the housing segment is in said first and second mounted positions.

10. The holder of claim 9 in which said support portion comprises a frusto-conical socket formed integrally with said housing segment, said socket having an entrance opening and an exit opening and extending in a generally downward direction at said second acute angle to position the exit opening within the neck portion of the base segment when the housing segment is in said first and second mounted positions wherein the operating head portion of the data pen is in communication with said aperture.

11. A holder for a data pen or wand of the type having an operating head portion and an elongated handle, the holder adapted for mounting in a horizontal or vertical position comprising:

(a) an elongated base assembly including a supporting surface extending at a first acute angle with the lower surface of the base assembly;

(b) a one piece housing segment having a front wall portion;

(c) a cone shaped support structure having an entrance opening formed in the front wall portion of the housing segment for receiving the data pen for support by said structure, said support structure extending in a generally downward direction from said wall portion at a second acute angle with the lower surface of the housing segment;

(d) and means for releasably mounting the housing segment to the supporting surface in two opposite mounted positions, whereby the support structure supports the data pen at an angle with the lower surface of the base assembly which is equal to the sum of said first and second acute angles when the housing segment is mounted to the supporting surface in the first mounted position on said supporting surface and whereby the support structure supports the data pen at an angle with the lower surface of the base assembly which is equal to difference between said first and second acute angles when the housing segment is mounted in the second mounted position on said supporting surface.

12. The holder as claimed in claim 11 in which said cone shaped support structure terminates in an exit opening wherein the head portion of the data pen is in communication with said base assembly.

13. The holder as claimed in claim 12 in which said base assembly includes a one piece molded plastic base segment having formed therein a vertically extending neck portion terminating in an opening which extends through the bottom surface of the base segment, the exit opening of the cone shaped support structure positioned within the opening of the neck portion when the housing segment is in said first and second mounted positions whereby any interfering substance on the operating head portion of the data pen will drop through the opening to the underside of the base segment.

14. The holder as claimed in claim 13 in which said base assembly includes a one piece hollow molded plastic support segment having a top peripheral edge portion which constitutes said supporting surface, said base segment further includes snap action means for mounting said support segment to said base segment whereby the support segment can be easily removed from said base segment.

15. The holder as claimed in claim 14 wherein said snap action means is molded integrally with said base segment and support segment.

16. The holder as claimed in claim 15 in which said snap action means includes a horizontally extending latching surface formed in a portion of said support segment, and a vertically extending latching portion formed in said base segment and positioned above the latching surface of said support segment for movement to a latching engagement position with said latching surface upon assembling the support segment to the base segment.

17. The holder as claimed in claim 11 in which the supporting surface of said support segment and the lower edge of said housing segment have front and rear mating portions, said releasably mounting means includes fastening members engaging each of said mating portions for securing the housing member to said support segment in said first and second positions.

18. The holder as claimed in claim 17 in which said first and second acute angles are each between 0° and 75°.

* * * * *